(12) United States Patent
Uchida

(10) Patent No.: US 8,873,089 B2
(45) Date of Patent: Oct. 28, 2014

(54) PRINTING SYSTEM, PRINT MANAGEMENT APPARATUS, PRINT CONTROL METHOD, AND STORAGE MEDIUM

(75) Inventor: Takayuki Uchida, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 707 days.

(21) Appl. No.: 13/162,770

(22) Filed: Jun. 17, 2011

(65) Prior Publication Data
US 2011/0317209 A1 Dec. 29, 2011

(30) Foreign Application Priority Data
Jun. 24, 2010 (JP) ................................. 2010-144108

(51) Int. Cl.
H04N 1/00 (2006.01)
G06F 3/12 (2006.01)
G06K 15/00 (2006.01)

(52) U.S. Cl.
CPC ............ *G06F 3/1288* (2013.01); *G06F 3/1203* (2013.01); *G06F 3/1273* (2013.01); *G06F 3/1239* (2013.01)
USPC .......................... 358/1.15; 358/1.14; 358/403

(58) Field of Classification Search
None
See application file for complete search history.

(56) References Cited

U.S. PATENT DOCUMENTS

| 6,813,369 B2 * | 11/2004 | Oki ............................... 382/100 |
| 2002/0015185 A1 * | 2/2002 | Onishi et al. ................. 358/1.16 |
| 2002/0120855 A1 * | 8/2002 | Wiley et al. .................... 713/189 |
| 2003/0081247 A1 * | 5/2003 | Sharma ......................... 358/1.15 |
| 2004/0117389 A1 * | 6/2004 | Enami et al. ................... 707/100 |
| 2005/0052698 A1 * | 3/2005 | Hirabayashi .................. 358/1.15 |
| 2006/0077456 A1 * | 4/2006 | Aoki ............................. 358/1.15 |
| 2008/0151286 A1 * | 6/2008 | Matsuo ......................... 358/1.15 |
| 2009/0213411 A1 * | 8/2009 | Fukumi ......................... 358/1.14 |

FOREIGN PATENT DOCUMENTS

| JP | 2002-149355 A | 5/2002 |
| JP | 2003-044244 A | 2/2003 |
| JP | 2004-152108 A | 5/2004 |
| JP | 2009-087159 A | 4/2009 |

* cited by examiner

*Primary Examiner* — King Poon
*Assistant Examiner* — Vincent Peren
(74) *Attorney, Agent, or Firm* — Canon USA, Inc., IP Division

(57) ABSTRACT

A printing system may include an archive job management apparatus and a print management apparatus. The archive job management apparatus stores job information relating a destination of an archive job, a quantity printing limit for the archive job, and archive job print history and manages the stored job information. The print management apparatus instructs printing of an archive job according to a print request from a client apparatus and includes an acquisition unit and a determination unit. Per the print request, the acquisition unit acquires the quantity printing limit and print history of the archive job. The determination unit determines that the archive job is printable if a number of times the archive job has been actually printed is equal to or less than a limiting number of times of printing based on a number of times of restrictive printing and the print history of the print requested archive job.

15 Claims, 15 Drawing Sheets

PRINTING SYSTEM, PRINT MANAGEMENT APPARATUS, PRINT CONTROL METHOD, AND STORAGE MEDIUM

BACKGROUND OF THE INVENTION

1. Field of the Invention

The present invention relates to a printing system, a print management apparatus, a print control method, and a storage medium. More specifically, the present invention relates to a technique capable of printing a document stored in a cloud server.

2. Description of the Related Art

It is feasible to print a document stored in a cloud via a print server. When a user accesses a web page of a cloud server computer via a web browser of a client computer though Internet, a document details screen of a target document, which the user wants to print can be displayed on the web page. If the user inputs a print instruction via the document details screen, the print instruction is redirected to the print server. The print server acquires the document and prints the document.

In this case, document data to be printed may be stored in the cloud server or may be managed by the print server. Further, document data may be stored in a storage service that provides a storage area in which any data can be stored. The user can instruct printing of the document from a web page screen of the cloud server, irrespective of a storage destination of the document.

However, it is necessary to limit the number of times of printing for a document data depending on image information. With regard to the above technique, as discussed in Japanese Patent Application Laid-Open No. 2002-149355, there is a conventional print server that can limit the number of times of printing with respect to a document managed by the print server itself. The above-described function is, for example, employed for a bill or an acknowledgement because it is desired for such a specific document to limit the number of times of printing.

The conventional print server configured to restrict the number of times of printing generally limits the number of times of printing for a document stored in the print server. If the print server receives a document, the received document is stored as a new document in the print server.

In this case, the following problem may arise if a document stored in an outside the print server, for example, a document (e.g., bill) stored in the cloud server is printed by the conventional print server. Specifically, if the conventional print server is repetitively instructed to print the same document stored in the cloud server, the print server stores and prints the document data as a new document each time. Therefore, there is a problem not to be able to limit the printing number of times cannot be limited even if printing the document many times is troublesome.

SUMMARY OF THE INVENTION

According to an aspect of the present invention, a printing system includes an archive job management apparatus including a job information management unit configured to store job information relating to an entity or a storage destination of an archive job, which is a print job stored in a storage medium, limiting number of times of printing for the archive job, and print history of the archive job, while associating each stored information with the other stored information, in the storage medium, and configured to manage the stored job information; and a print management apparatus configured to instruct an image forming apparatus to perform printing of an archive job according to a print request from a client apparatus, wherein the print management apparatus includes: an acquisition unit configured to acquire the limiting number of times of printing and the print history as information about the archive job according to the print request from the archive job management apparatus, and a determination unit configured to determine that the archive job is printable if a number of times the archive job has been actually printed is equal to or less than the limiting number of times of printing based on a number of times of restrictive printing and the print history of the print requested archive job.

According to the present invention, the archive job management apparatus manages the entity or the storage destination of a archive job, the limiting number of times of printing for the archive job, and the print history of the archive job while associating them with each other. The print management apparatus acquires the limiting number of times of printing and the print history of the archive job, which corresponds to print request from the archive job management apparatus. The print management apparatus determines whether the archive job is printable based on the limiting number of times of printing and the print history of the archive job, which corresponds to print request. Accordingly, the print management apparatus can limit the number of times the archive document can be printed regardless of a storage destination of the document.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

Figure 1:
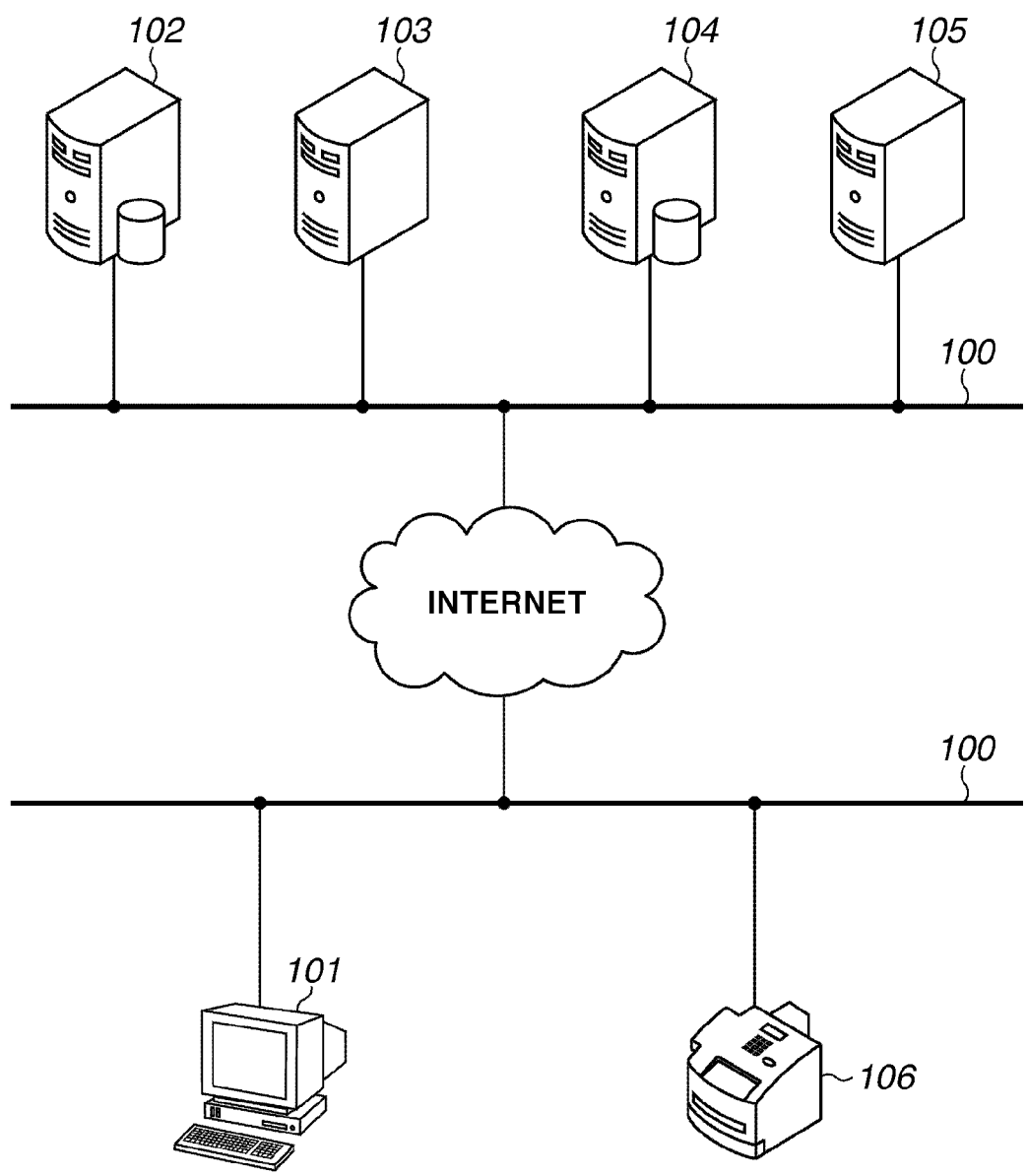
FIG. 1 illustrates an example configuration of a printing system.

A first exemplary embodiment is described below with reference to attached drawings. FIG. 1 is a block diagram illustrating an example configuration of a printing system. The printing system includes a client apparatus 101, a cloud platform service 102, a archive job generation service 103, a storage service 104, a print server 105, and an image forming apparatus 106, which are connected to each other to be able to communicate with each other. The printing system constitutes, as a whole, a network 100 and executes a print control.

The client apparatus 101 is an apparatus capable of issuing a request to the cloud platform service 102, the print server 105, or the image forming apparatus 106 that serves as a printer (i.e., a printing apparatus). A client application program capable of executing a request, such as a web browser, is installed on the client apparatus 101. The client apparatus 101, which is provided in the printing system is not limited to only one, but a plurality of client apparatuses can be provided.

The cloud platform service 102 can perform display and transmission a data, which the service 102 itself holds, according to a request from the client apparatus 101 or the print server 105. For example, the cloud platform service 102 can be realized by "Software as a service (SaaS)" that can provide a software service via a network. Alternatively, the cloud platform service 102 can be realized by "Platform as a service (PaaS)" that can provide a software development/execution platform. More specifically, for example, Salesforce CRM/force.com provided by Salesforce.com Inc. can realize the cloud platform service 102.

The archive job generation service 103 can generate a archive job and inputs the generated archive job to the print server 105, the cloud platform service 102, or the storage service 104. The archive job is, for example, a print job of form data including data designated by a user or printable document data (e.g., PDF data) that is generated beforehand by a word processing application program.

The storage service 104 is an optional service that provides a storage area that can store any data. In the present exemplary embodiment, the storage service 104 stores the archive job. Further, the storage service 104 transmits the archive job to the print server 105 according to a request from the print server 105. For example, hypertext transfer protocol (HTTP) or simple object access protocol (SOAP) can be used when the print server 105 communicates with the storage service 104.

The print server 105 performs archive job print processing in response to a request received from the client apparatus 101. In the present exemplary embodiment, the print server 105 performs print processing for a archive job stored therein, a archive job acquired from the cloud platform service 102, and a archive job acquired from the storage service 104.

The image forming apparatus 106 is a printing device that can acquire a archive job from the print server 105 according to a request from the client apparatus 101 and can serve as a physical device that analyzes the acquired archive job and performs printing.

The image forming apparatus 106 can employ any printing apparatus such as an electro-photographic laser beam printer, an inkjet printer, a thermal transfer printer. The image forming apparatus 106 is not limited to one, but a plurality of image forming apparatuses can be provided.

The above described constituent components are connected to the network 100 and can communicate with each other. The network 100 is a communication network. The network 100 can be realized by a combination (at least two) of Internet, a local area network (LAN), a wide area network (WAN), a telephone line, a dedicated digital line, an automated teller machine (ATM) line, a frame relay line, a cable television line, and a data broadcasting wireless line.

The network 100 can be any type, and communication means between each constituent component can be deferent as long as data transmission and reception with another constituent component can be performed. In FIG. 1, the client apparatus 101, the image forming apparatus 106, the cloud platform service 102, the archive job generation service 103, the storage service 104, and the print server 105 are connected to each other and can communicate with each other via Internet.

Figure 2:
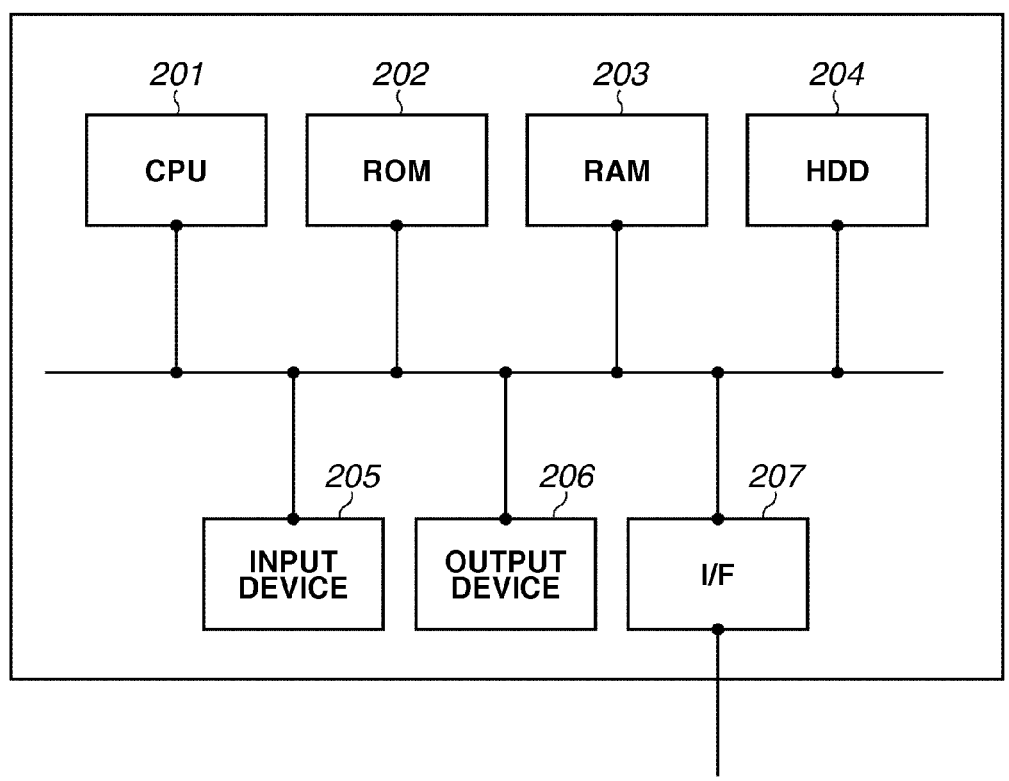
FIG. 2 illustrates a hardware configuration of a client apparatus.

FIG. 2 is a block diagram illustrating an example of a hardware configuration applicable to each of the client apparatus 101, the cloud platform service 102, the archive job generation service 103, the storage service 104, and the print server 105.

In FIG. 2, a central processing unit (CPU) 201 can control each device (e.g., a read only memory (ROM) 202, a random access memory (RAM) 203, etc.) connected via an internal bus directly or indirectly and executes a program that can realize processing according to the present exemplary embodiment. The ROM 202 stores a basic input/output system (BIOS). The RAM 203 is a direct storage device that can serve as a work area for the CPU 201 or a temporary storage area into which a software module can be loaded to realize processing according to the present exemplary embodiment.

A hard disk drive (HDD) 204 is an indirect storage device that stores an operating system (OS), which is a basic software and software modules. A solid state drive (SSD) can be employed as an indirect storage device. An input device 205 is a keyboard (not illustrated) or a pointing device (not illustrated). A display device (not illustrated) is connected as an output device 206. The apparatus is connected to the network 100 via an interface (I/F) 207.

According to the above-described hardware, the BIOS is executed by the CPU 201 upon launching and the OS is loaded from the HDD 204 into the RAM 203. The CPU 201 can load, according to an operation of the OS, various software modules from the HDD 204 to the RAM 203 in a executable manner The various software modules are executed and operated by the CPU 201 cooperating with each of the above-described devices. Further, the I/F 207 is connected to the network 100 and controlled by the CPU 201 according to an operation of the OS to realize communication with an external device.

Figure 3:
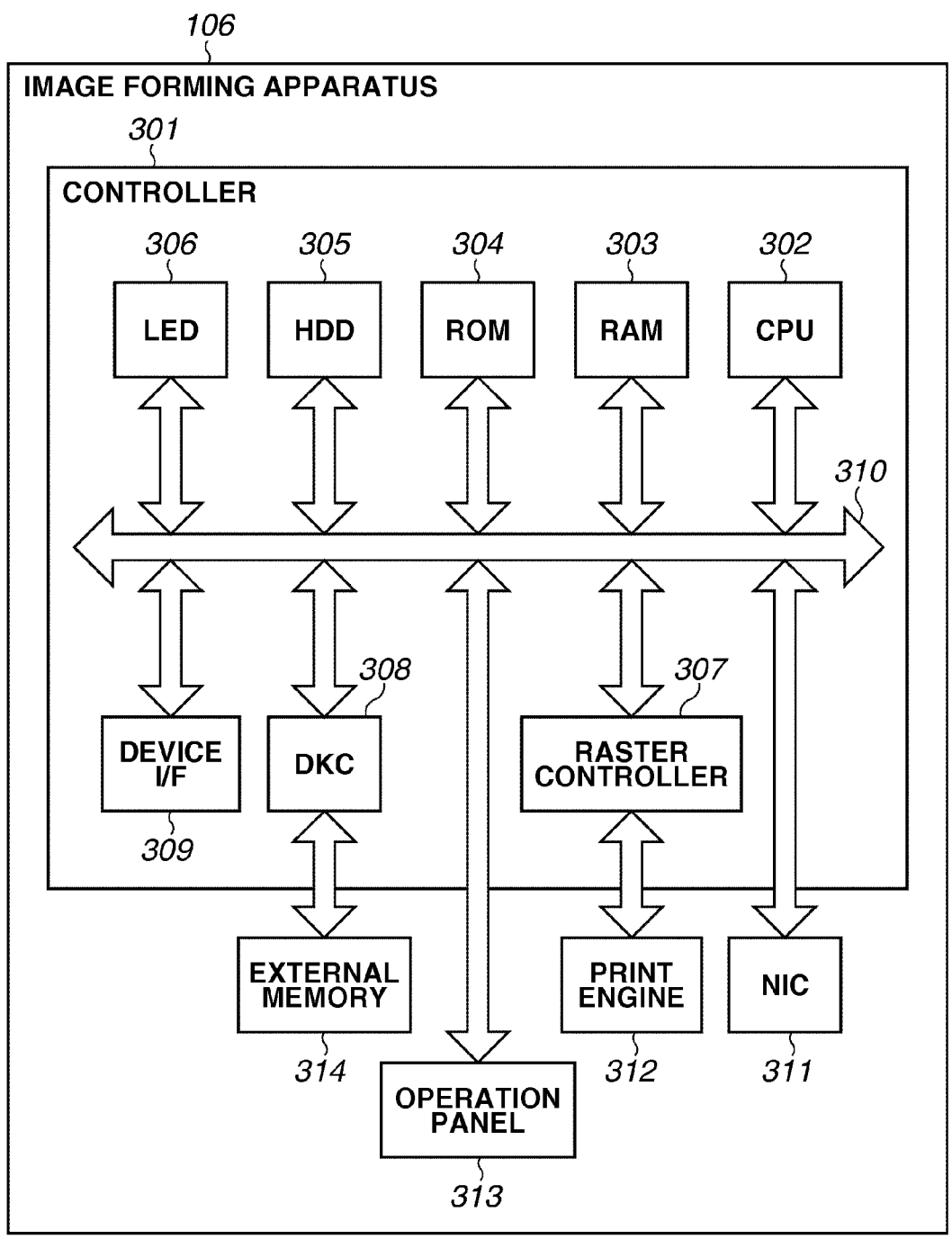
FIG. 3 is a block diagram illustrating a hardware configuration of an image forming apparatus.

FIG. 3 is a block diagram illustrating an example of hardware configuration of the image forming apparatus 106. A controller 301 is a device to operate a control system for the image forming apparatus 106.

A CPU 302 performs an overall control for the image forming apparatus 106 and performs integrated control of access to various devices connected to the system bus 310. The CPU 302 performs the above-described control based on a control program stored in a ROM 304 or a control program stored in an external memory 314 connected via a disk controller (DKC) 308 as well as based on resource data (i.e., resource information).

A RAM 303 is functionally operable as a main memory or a work area of the CPU 302. The image forming apparatus 106 according to the present exemplary embodiment includes an expansion port (not illustrated) to which an optional RAM is connectable to increase the memory capacity.

An HDD 305 is an external storage unit, which is functionally operable as a mass storage memory. For example, the HDD 305 stores Web service programs and relevant programs. An operation panel (i.e., an operation unit) 313 includes a user interface operable to perform a pull print operation and a pull print switching button. Further, to enable users to set an operation mode of the image forming apparatus 106, display an operational status of the image forming apparatus 106, and perform copy designation and other operations, the operation panel (i.e., the operation unit) 313 includes various buttons and a display device (e.g., a liquid crystal panel and a light-emitting diode (LED)).

A network interface card (NIC) 311 is a communication interface configured to transmit and receive data to and from an external apparatus. A print engine 312 is, for example, an electro-photographic type (a laser beam type), an inkjet type, or a sublimation (a thermal transfer) type, which is operable based on a conventionally known print technique.

A raster controller 307 controls converting a print data (PDL language or PDF language) into an image data. A device interface (I/F) 309 is a connection interface configured to connect to an external device via a Universal Serial Bus (USB) for example.

Figure 4:
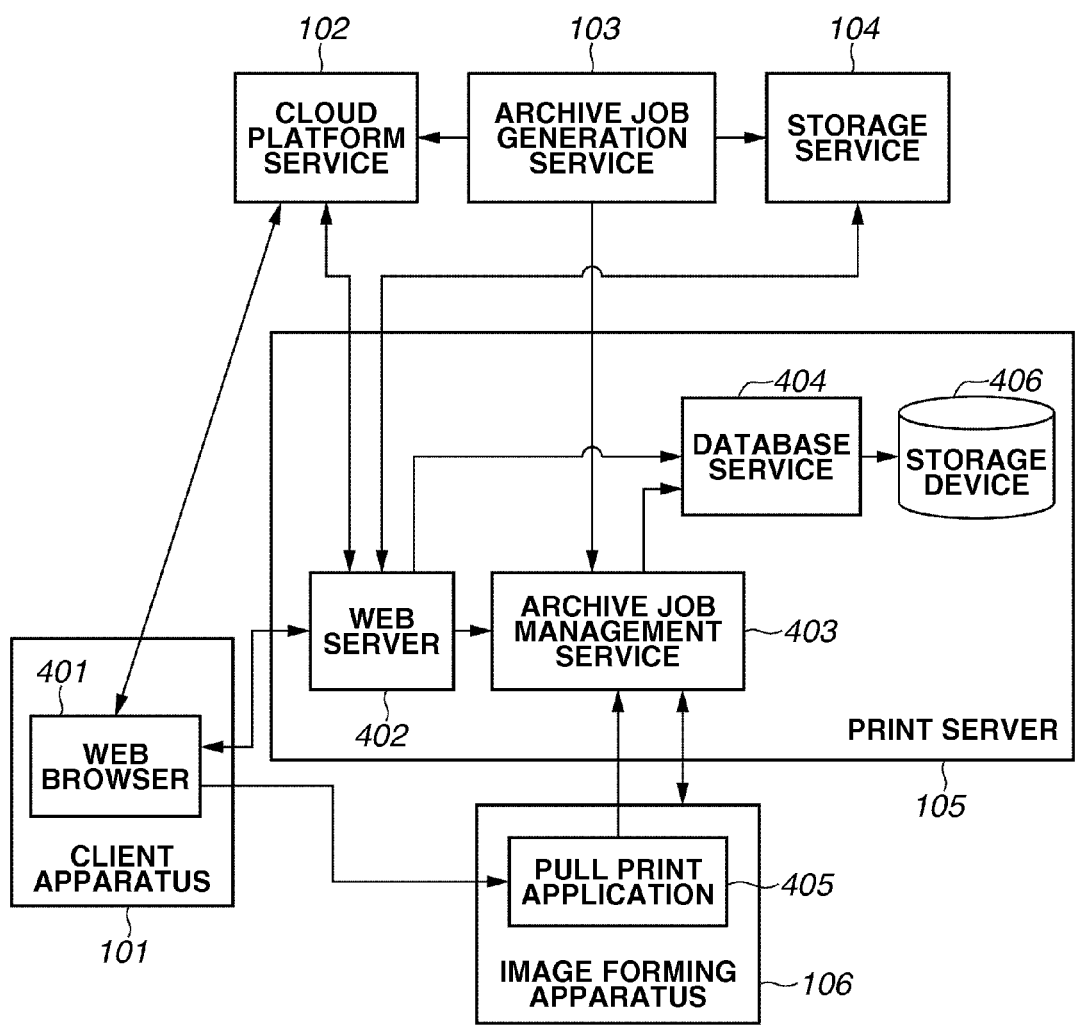
FIG. 4 illustrates a system configuration of the printing system.

FIG. 4 illustrates an example system configuration of the printing system. The client apparatus 101 includes a web browser 401 serving as a user interface application. The web browser 401 is a program that requests the cloud platform service 102 or a web server 402 of the print server 105 to acquire a web page and displays a response result on a display device of the client apparatus 101. The CPU 201 of the client apparatus 101 executes the web browser 401. Further, the web browser 401 redirects the response of a print request to the web server 402 to the image forming apparatus 106.

The cloud platform service 102 performs management of each user who uses the cloud platform service 102, management of various data including archive job, and management of setting for redirection to the print server 105.

The archive job generation service 103 generates a archive job periodically or at timing designated by a user. Then, the archive job generation service 103 transmits the generated archive job to a designated storage destination. The archive job storage destination can be designated every time generation of a archive job is requested. The archive job can also be archive in a pre-designated storage destination. A user can designate a desired storage destination. Alternatively, the designation of a storage destination can be performed automatically according to a predetermined rule.

The web server 402 is functionally operable as a Web application. The client apparatus 101 can access the web server 402 via the web browser 401. If the web server 402 receives a print request from the web browser 401, the web server 402 acquires a archive job from the cloud platform service 102 or the storage service 104.

Then, the web server 402 sends a print instruction including the acquired archive job to a archive job management service 403. Further, if the web server 402 receives a print request from the web browser 401, the web server 402 instructs the archive job management service 403 to print the archive job managed by the archive job management service 403

Further, the web server 402 generates a page including an embedded command required when the image forming apparatus 106 acquires a archive job from the archive job management service 403 and performs a pull print operation. The web server 402 sends the generated page to the web browser 401. For example, Java (registered trademark) Script can realize the command embedded in the page.

If the archive job management service 403 receives a archive job from the web server 402, the archive job management service 403 stores the received archive job in a recording device (e.g., a storage device 406). Further, the archive job management service 403 registers information relating to the archive job (archive job information) in a database service 404. The archive job information includes, for example, archive job identification ID, document name, status, reception date/time, user ID, number of times of printing, and limiting number of times of printing.

In the present exemplary embodiment, the archive job identification ID is information that can uniquely identify each archive job. The document name is a name of the archive job. The status is information representing a state of the archive job. The status is, for example, "standby", "print-in-progress", "normal end", or "error end." The reception date/time is information representing the time when the archive job management service 403 has received the archive job. The user ID is information that can identify an owner of the archive job. The number of times of printing is the number of times the archive job has been actually printed. The limiting number of times of printing is the number of times the archive job is printable.

The archive job management service 403 can transmit a archive job to the image forming apparatus 106. If the printing of the archive job is successfully terminated, the number of times of printing is counted up. Further, when the printing of the archive job is performed, the archive job management service 403 determines whether the number of times of printing is equal to or greater than the limiting number of times of printing. If it is determined that the number of times of printing has already reached the limiting number of times of printing, the archive job management service 403 regards the printing of the archive job as an error and does not transmit the archive job to the image forming apparatus 106.

Figure 5:
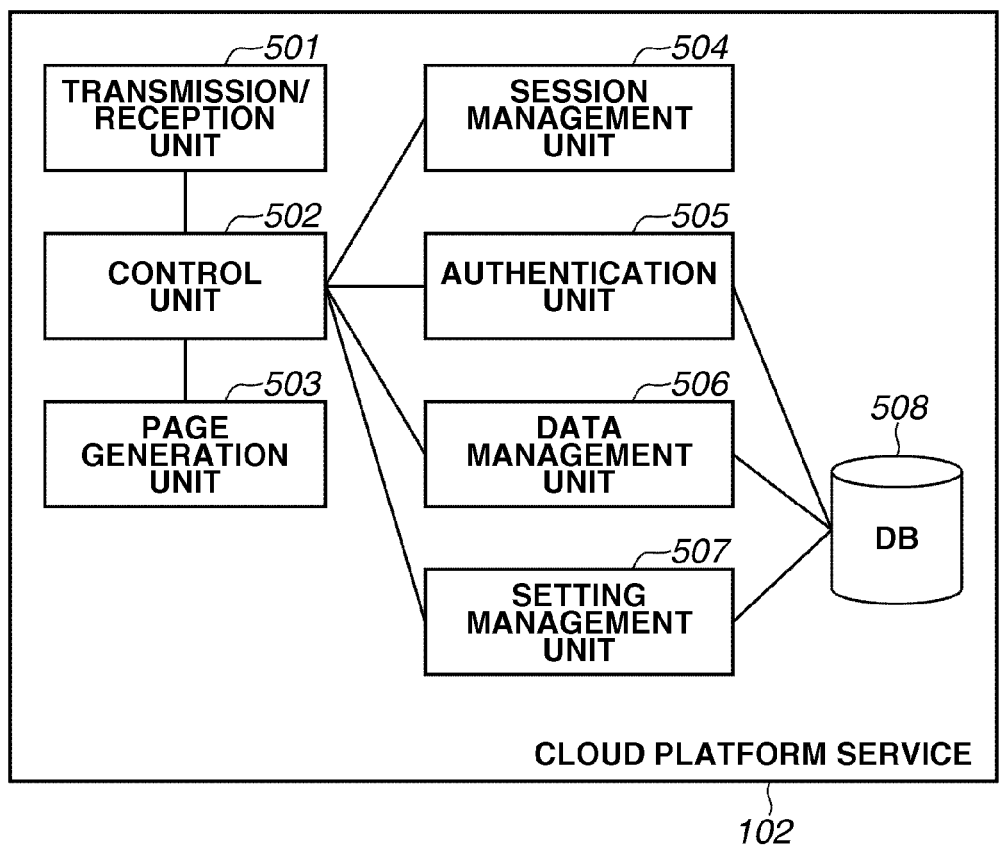
FIG. 5 illustrates a software configuration of a cloud platform service.

FIG. 5 illustrates an example of a software module configuration of the cloud platform service 102. Each software module illustrated in FIG. 5 is stored in the HDD 204 illustrated in FIG. 2. As described above, each software module can be loaded into the RAM 203 and executed by the CPU 201. A control unit 502 can control various processing by each constituent component of the cloud platform service 102. A transmission/reception unit 501 can manage each of the web browser 401, the web server 402, and the archive job generation service 103. A page generation unit 503 can generate a web page to be transmitted as a response to the web browser 401.

An authentication unit 505 can authenticate a login request user. A session management unit 504 can manage session information of a user who has succeeded in authentication by the authentication unit 505. A data management unit 506 can manage user data managed by the cloud platform service 102 and a archive document data. A setting management unit 507 can manage setting required to perform redirecting to the print server 105.

A database (DB) 508 is a storage area that can store user data managed by the cloud platform service 102 and is stored in the HDD 204 illustrated in FIG. 2. Further, the DB 508 stores setting information that can perform redirecting to the print server 105. The archive document data is described below in detail. The cloud platform service 102 can execute below-described processing based on a cooperative operation performed by the above-described constituent components.

Figure 6:
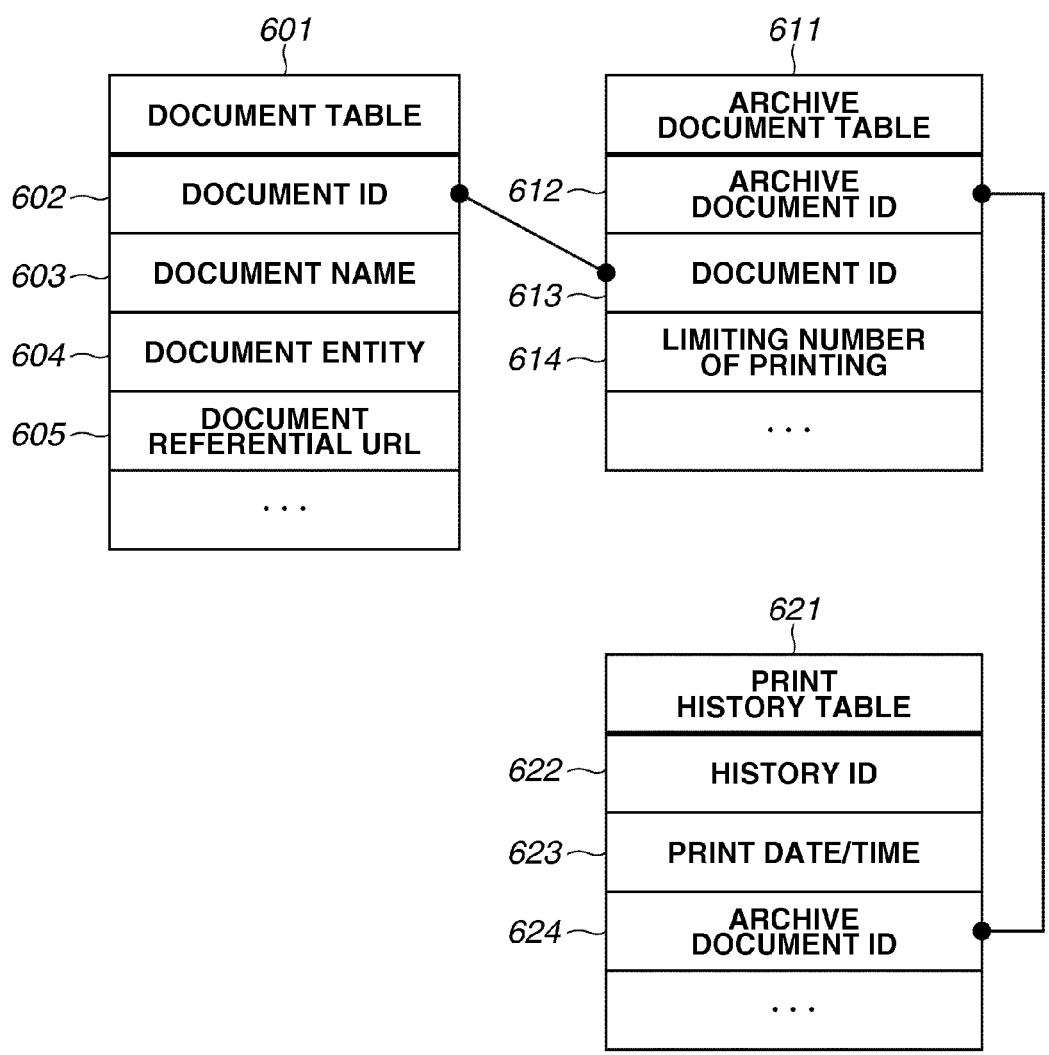
FIG. 6 illustrates a table configuration of archive document data.

FIG. 6 illustrates an example of a table configuration of the archive document data managed by the data management unit 506. A document table 601 is a table that stores a archive job. A document ID 602 is an ID required to identify uniquely each document record. The document ID 602 can be automatically allocated by the cloud platform service 102.

A document name 603 is a name of the archive job. A document entity 604 is a data (binary data) of the archive job. A document referential URL 605 is a URL that indicates positional information of the archive job in a case where the archive job is stored in the print server 105 or in the storage service 104. Either the document entity 604 or the document referential URL 605 is stored in a document record.

A archive document table 611 is a table that stores attribute information of each archive job. A archive document ID 612 is a ID required to identify uniquely each archive document record. The archive document ID 612 can be automatically allocated by the cloud platform service 102. A document ID 613 is an ID required to identify each document record. The document ID 613 corresponds (relates) to the document ID 602 of the document table 601.

More specifically, two document IDs 602 and 613 are corresponding information that can link the document table 601 with the archive document table 611. Further, the limiting number of times of printing 614 represents the number of times the archive job is printable. The number of times of restrictive printing 614 can be appropriately determined beforehand according to a document. In the present exemplary embodiment, the document table 601 and the archive document table 611 are in a one-to-one relationship.

A print history table 621 is a table that stores a print history of a archive job. A history ID 622 is an ID required to identify uniquely each print history record. The history ID 622 can be automatically allocated by the cloud platform service 102. A print date/time 623 indicates printing date and time when archive job is printed. A archive document ID 624 is an ID required to identify an archive document record. The archive document ID 624 corresponds (relates) to the archive document ID 612 in the archive document table 611. More specifically, two archive document IDs 612 and 624 are corresponding information that can link the archive document table 611 with the print history table 621. In the present exemplary embodiment, the archive document table 611 and the print history table 621 is in a one-to-multiple relationship.

Figure 7:
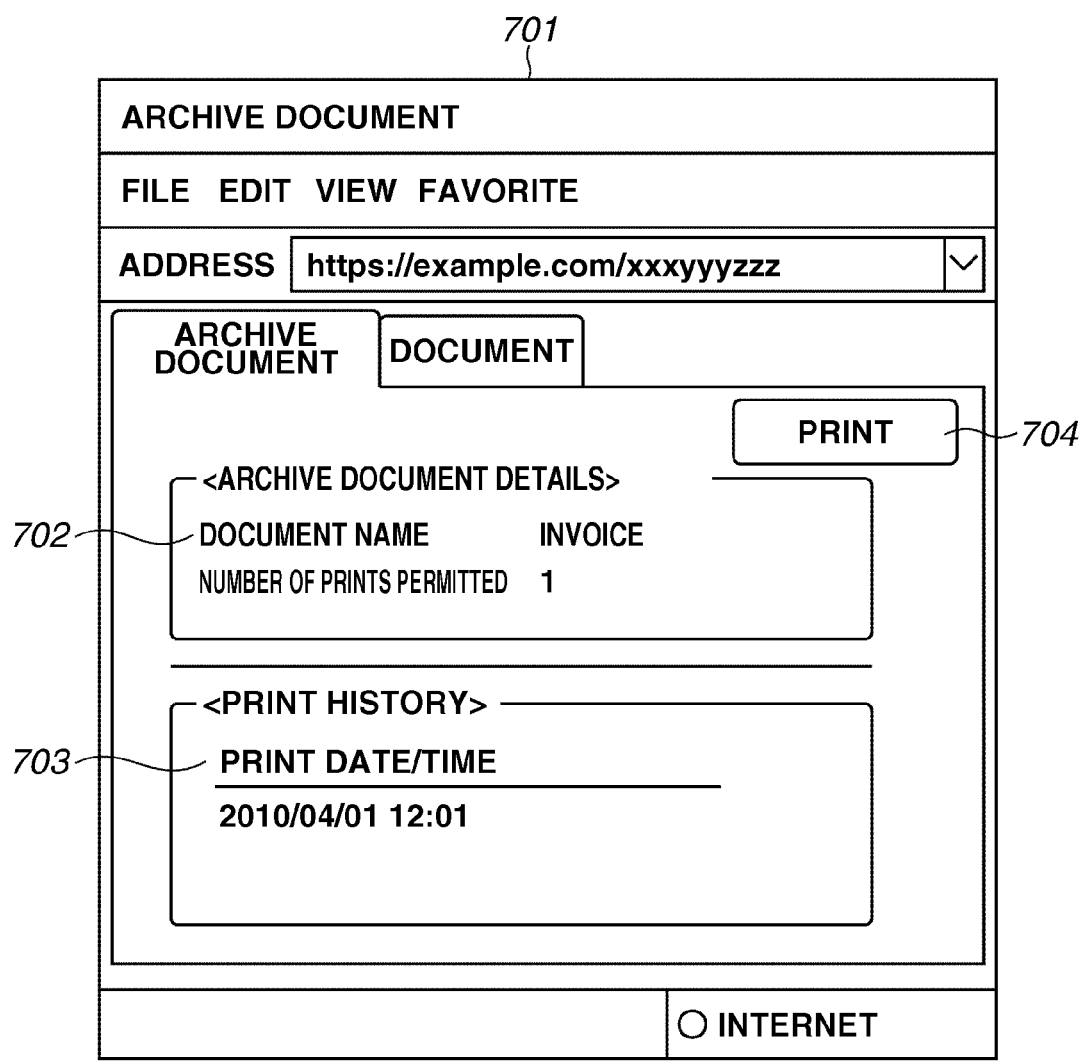
FIG. 7 illustrates a archive document screen.

FIG. 7 illustrates an example of a archive document screen 701 that can be displayed on the display device of the client apparatus 101 when the web browser 401 of the client apparatus 101 accesses the cloud platform service 102 to obtain archive document data. The archive document screen 701 illustrated in FIG. 7 can be displayed after a user has successfully logged in the cloud platform service 102.

A detailed information 702 and a print history 703 of a archive document record are displayed on the archive document screen 701. Further, the archive document screen 701 includes a print button 704 for which the setting to perform the redirect to the print server 105 has been performed.

An operation to be performed when the print button 704 is pressed is defined beforehand for the print button 704. The following contents can be set (defined) for an example operation to be performed when the print button 704 is pressed. For example, the setting information includes uniform resource identifiers (URI) of the print server 105, session ID of a login user, and URL required for access to the cloud platform service 102.

Further, the setting information includes generating a redirect URL to the print server 105 based on the archive document ID 612 of the archive document record and transmitting the generated redirect URL to the web browser 401. The definition of an operation to be performed when the print button 704 is pressed can be managed by the setting management unit 507 of the cloud platform service 102.

Figure 8:
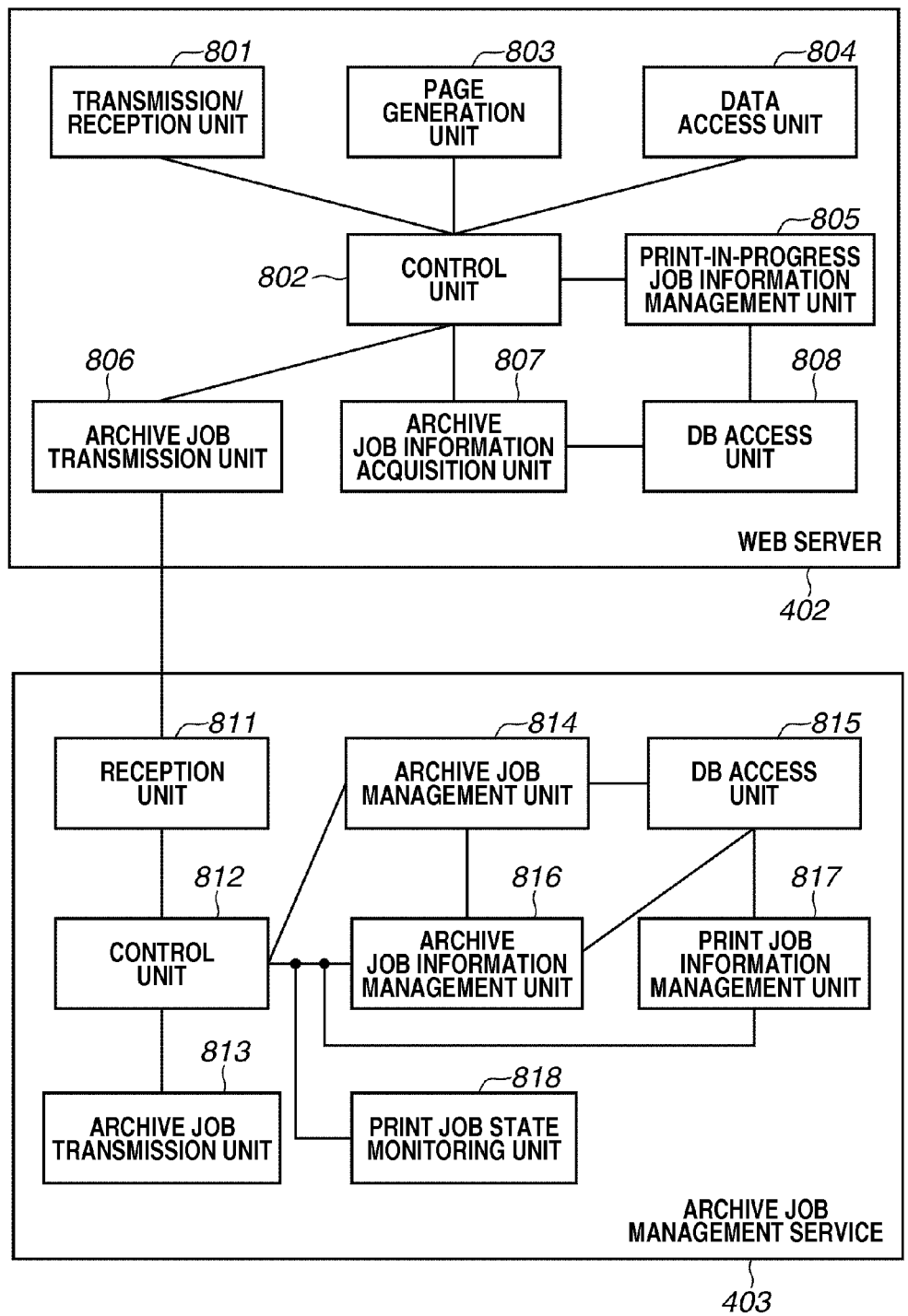
FIG. 8 illustrates a software configuration of a web server and a archive job management service.

FIG. 8 illustrates an example of a software module configuration of the web server 402 of the print server 105 and the archive job management service 403. Each software module illustrated in FIG. 8 is stored in the HDD 204 illustrated in FIG. 2. As described above, each software module can be loaded into the RAM 203 and executed by the CPU 201.

A control unit 802 can control various processing to be performed by each constituent component of the web server 402. A transmission/reception unit 801 can manage communication with each of the web browser 401 of the client apparatus 101, the cloud platform service 102, the archive job generation service 103, and the storage service 104.

A page generation unit 803 generates a web page to be transmitted as a response to the web browser 401. A data access unit 804 can access the cloud platform service 102 or the storage service 104 to request acquisition and update of various data.

A print-in-progress job information management unit 805 can manage the information relating to a "print-in-progress archive job (print-in-progress archive job information)" acquired from the cloud platform service 102 or the storage service 104. The print-in-progress archive job information is described below in detail.

A archive job information acquisition unit 807 uses a DB access unit 808 to acquire archive job information from the database service 404. A archive job transmission unit 806 transmits the archive job to the archive job management service 403. The web server 402 can execute below-described processing based on a cooperative operation performed by the above-described constituent components.

Further, a control unit 812 can control various processing to be performed by each constituent component of the archive job management service 403. A reception unit 811 can receive a archive job from the archive job generation service 103 or from the archive job transmission unit 806 of the web server 402. Further, the reception unit 811 can receive a print request from the image forming apparatus 106.

A archive job transmission unit 813 can transmit a archive job to the image forming apparatus 106. A archive job management unit 814 can manage, via a DB access unit 815, a archive job archive in the database service 404. A archive job information management unit 816 can manage, via the DB access unit 815, stored job information stored in the database service 404.

A print job information management unit 817 can manage, via the DB access unit 815, print job information stored in the database service 404. The print job information includes, for example, print job identification ID, document name, status, reception date/time, and user ID. The print job identification ID is information for uniquely identifying a print job. The document name is a name of a document of the print job. The status is information representing the state of the print job.

The status is an information that represents, for example, "print-in-progress" that indicates a state where the image forming apparatus 106 is currently executing print processing. The status further includes state information, such as "normal end" or "error end", which indicates a result of a completed printing. The reception date/time is information representing the time when the archive job management service 403 has received the print request. The user ID is information that can identify a user who has executed printing. A print job state monitoring unit 818 can receive a "notification relating to print job progress/result information" from the image forming apparatus 106.

Figure 9:
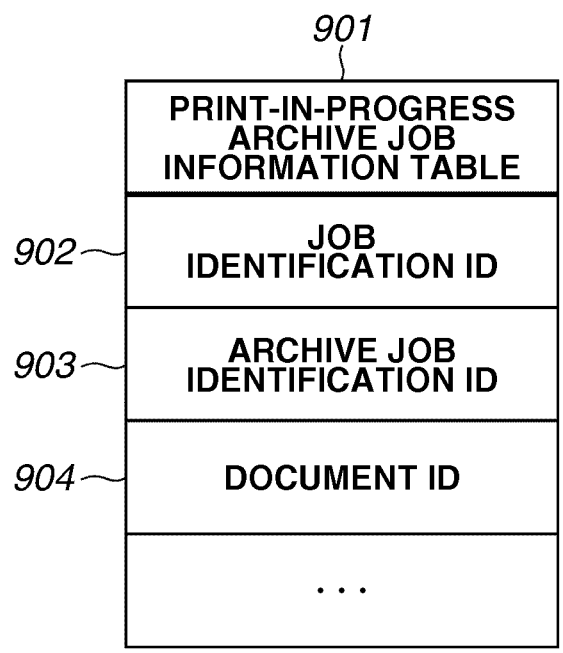
FIG. 9 illustrates a table configuration of print-in-progress archive job information.

FIG. 9 illustrates an example of a table configuration of the print-in-progress archive job information that can be managed by the database service 404. A job identification ID 902 is an ID to identify uniquely a archive job, which can be acquired from the cloud platform service 102 or the storage service 104, whose printing is currently in progress. A archive job identification ID 903 is an ID required to identify a archive job whose printing is currently in progress. A value of the archive job identification ID of the archive job information is set. A document ID 904 stores a value of the document ID 613 of the archive document record.

Next, an example procedure of print processing that can be performed by the printing system according to the present exemplary embodiment is described below in detail with reference to the attached drawings. In the flowchart illustrated in FIG. 10, an abbreviation "CPS" stands for the cloud platform service.

Figure 10:
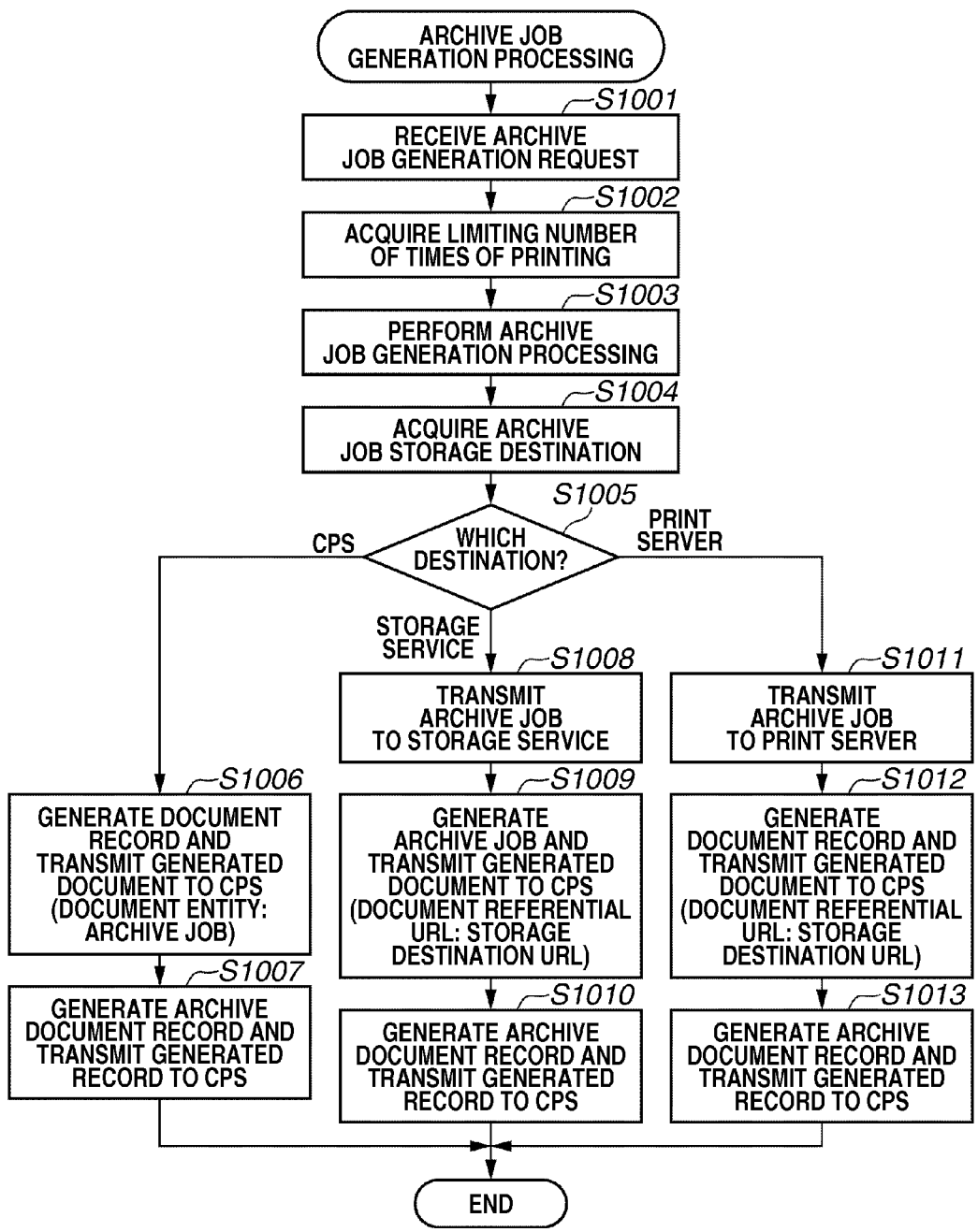
FIG. 10 is a flowchart illustrating archive job generation processing.
Figure 11:
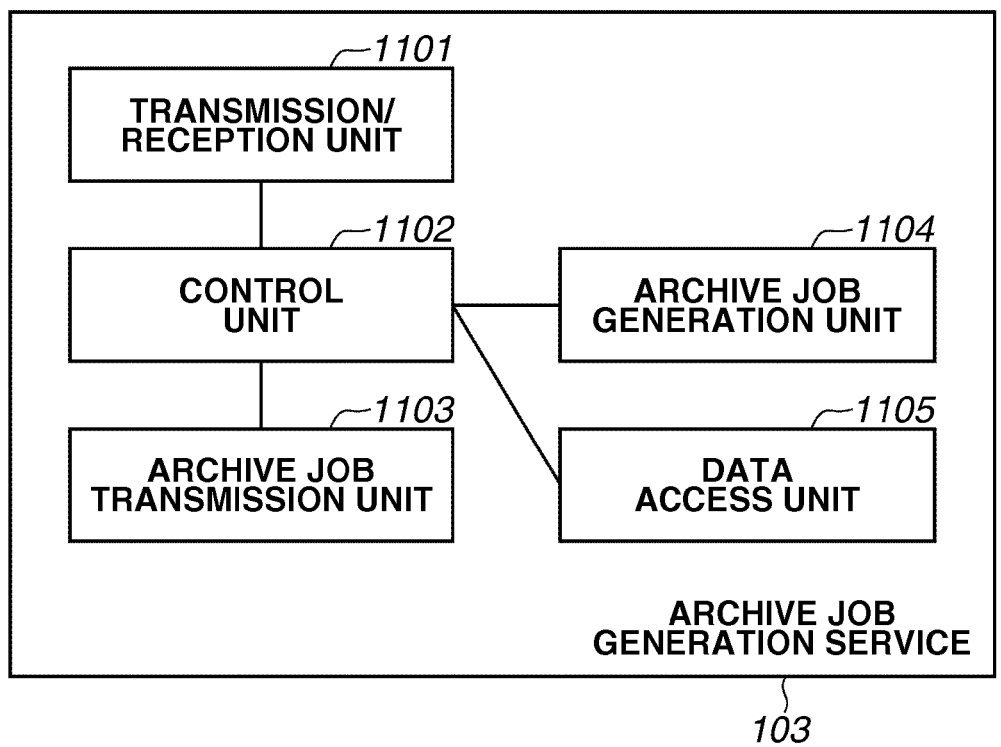
FIG. 11 illustrates a software configuration of a archive job generation service according to an exemplary embodiment.

FIG. 10 is a flowchart illustrating an example of archive job generation processing that can be performed by the archive job generation service 103. FIG. 11 illustrates an example of a software module configuration of the archive job generation service 103. A control unit 1102 includes the CPU 201, the RAM 203, the ROM 202, and the HDD 204. The processing procedure of the flowchart is stored in any of the storage unit of the RAM 203, the ROM 202, and the HDD 204 of the control unit 1102 and executed by the CPU 201.

First, in step S1001, a transmission/reception unit 1101 receives a archive job generation request, for example, from the web browser 401 or from other client application. An already-known technique is usable to realize the archive job generation request and therefore a detailed description thereof is omitted in the present exemplary embodiment.

Next, in step S1002, the control unit 1102 acquires the limiting number of times of printing included in the archive job generation request. If the number of times of restrictive printing is not included in the above-described request, the control unit 1102 employs a default value for the limiting number of times of printing.

Next, in step S1003, a archive job generation unit 1104 performs archive job generation processing. An already-known technique is usable to realize the archive job generation processing (i.e., generation processing of form data including data designated by a user) to be performed by the archive job generation service 103. Therefore, a detailed description is omitted in the present exemplary embodiment.

Next, in step S1004, the control unit 1102 acquires archive job storage destination information (i.e., information indicating a designation storage destination) included in the archive job generation request. If the designation storage destination is not included in the archive job generation request, the control unit 1102 acquires a default storage destination. Then, in step S1005, the control unit 1102 determines the archive job storage destination.

If the archive job storage destination is the cloud platform service 102 as a result in the above-described determination, the processing proceeds to step S1006. In step S1006, the control unit 1102 generates, as information relating to the document entity 604, a document record including the archive job generated in step S1003. Then, a data access unit 1105 transmits the generated document record to the cloud platform service 102.

Next, in step S1007, the control unit 1102 generates a archive document record. In this case, the control unit 1102 sets a document ID (the document ID 602) obtained from the cloud platform service 102, which results from the execution in step S1006, as information relating to the document ID 613 of the archive document record to be generated.

Further, the control unit 1102 sets the limiting number of times of printing acquired in step S1002, as information relating to the limiting number of times of e printing 614 in the archive document record. Then, the data access unit 1105 transmits the archive document record including the above-described information to the cloud platform service 102. Then, the control unit 1102 terminates the processing of the flowchart illustrated in FIG. 10.

In step S1005, if it is determined that the archive job storage destination is the storage service 104, the processing proceeds to step S1008. A archive job transmission unit 1103 transmits the archive job generated in step S1003 to the storage service 104.

Next, in step S1009, the control unit 1102 generates a document record. In this case, the control unit 1102 sets the storage destination URL obtained from the storage service 104, which results from the execution in step S1008, as information relating to the document referential URL 605 of the document record. Then, the data access unit 1105 transmits the generated document record to the cloud platform service 102.

Next, in step S1010, the control unit 1102 generates a archive document record. In this case, the control unit 1102 sets the document ID (the document ID 602) obtained from the cloud platform service 102, which results from the execution in step S1009, as information relating to the document ID 613 of the archive document record.

Further, the control unit 1102 sets the limiting number of times of printing acquired in step S1002, as information relating to the number of times of restrictive printing 614 in the archive document record. Then, the data access unit 1105 transmits the archive document record including the above-described information to the cloud platform service 102. Then, the control unit 1102 terminates the processing of the flowchart illustrated in FIG. 10.

In step S1005, if it is determined that the archive job storage destination is the print server 105, the processing proceeds to step S1011. In step S1011, the archive job transmission unit 1103 transmits the archive job together with the limiting number of times of printing acquired in step S1002 to the print server 105. The storage destination URL is obtained from the print server 105 as a return value resulting from the execution in step S1011. The obtained storage destination URL includes the archive job identification ID.

Next, in step S1012, the control unit 1102 generates a document record. In this case, the control unit 1102 sets the storage destination URL acquired in step S1011, as information relating to the document referential URL 605 of the document record. Then, the data access unit 1105 transmits the generated document record to the cloud platform service 102.

Next, in step S1013, the control unit 1102 generates a archive document record. In this case, the control unit 1102 sets the document ID (the document ID 602) obtained from the cloud platform service 102, which results from the execution in step S1012, as information relating to the document ID 613 of the archive document record to be generated.

Further, the control unit 1102 sets the limiting number of times of printing acquired in step S1002, as the limiting number of times of printing 614 in the archive document record. Then, the data access unit 1105 transmits the archive document record including the above-described information to the cloud platform service 102. Then, the control unit 1102 terminates the processing of the flowchart illustrated in FIG.

10. Through the above-described processing, the archive job generation service 103 can complete the archive job generation processing.

Figure 12:
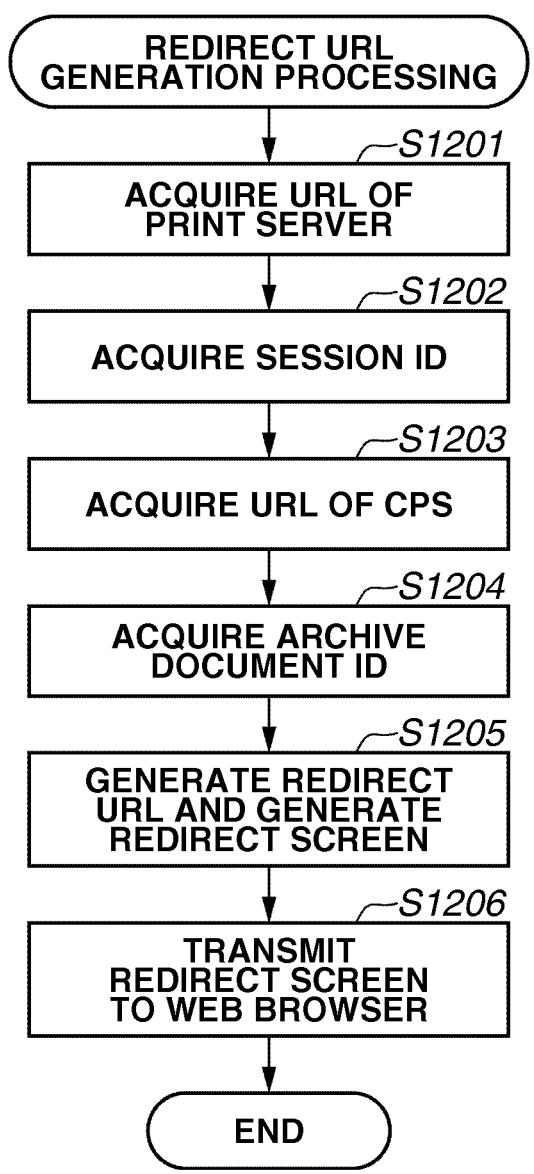
FIG. 12 is a flowchart illustrating first redirect uniform resource locator (URL) generation processing.

FIG. 12 is a flowchart illustrating an example of redirect URL generation processing that can be performed by the cloud platform service 102 when the print button 704 is pressed on the archive document screen 701. The control unit 502 includes the CPU 201, the RAM 203, the ROM 202, and the HDD 204. The processing procedure of the flowchart is stored in any of storage units including the RAM 203, the ROM 202, and the HDD 204 of the control unit 1102 and executed by the CPU 201.

Further, in this case, a user operation to login the cloud platform service 102 via a login screen (not illustrated) is already completed and the archive document screen 701 illustrated in FIG. 7 is already displayed on the web browser 401. Further, as a definition of the pressing operation of the print button 704, it is presumed that the above-described information is already set.

If the depression of the print button 704 by a user is detected, then in step S1201, the control unit 502 acquires URL information of the print server 105 from the setting management unit 507.

Next, in step S1202, the control unit 502 acquires a session ID from the session management unit 504. Next, in step S1203, the control unit 502 acquires URL information required for access to the cloud platform service 102 from the setting management unit 507.

Next, in step S1204, the control unit 502 acquires the archive document ID 612 of the archive document record displayed on the archive document screen 701. Next, in step S1205, the control unit 502 generates a redirect URL based on the acquired URL of the print server 105, the session ID, the URL required for access to the cloud platform service 102, and the archive document ID 612. Then, the page generation unit 803 generates a response screen that includes the generated redirect URL. As described above, the print server 105 can be identified by the URL of the print server 105 and the cloud platform service 102 can be identified by the URL required for access to the cloud platform service 102.

Next, in step S1206, the control unit 502 transmits the response screen generated in step S1205 to the web browser 401. Then, the control unit 502 terminates the processing of the flowchart illustrated in FIG. 12. Through the above-described processing, the cloud platform service 102 can complete the redirect URL generation processing.

Figure 13:
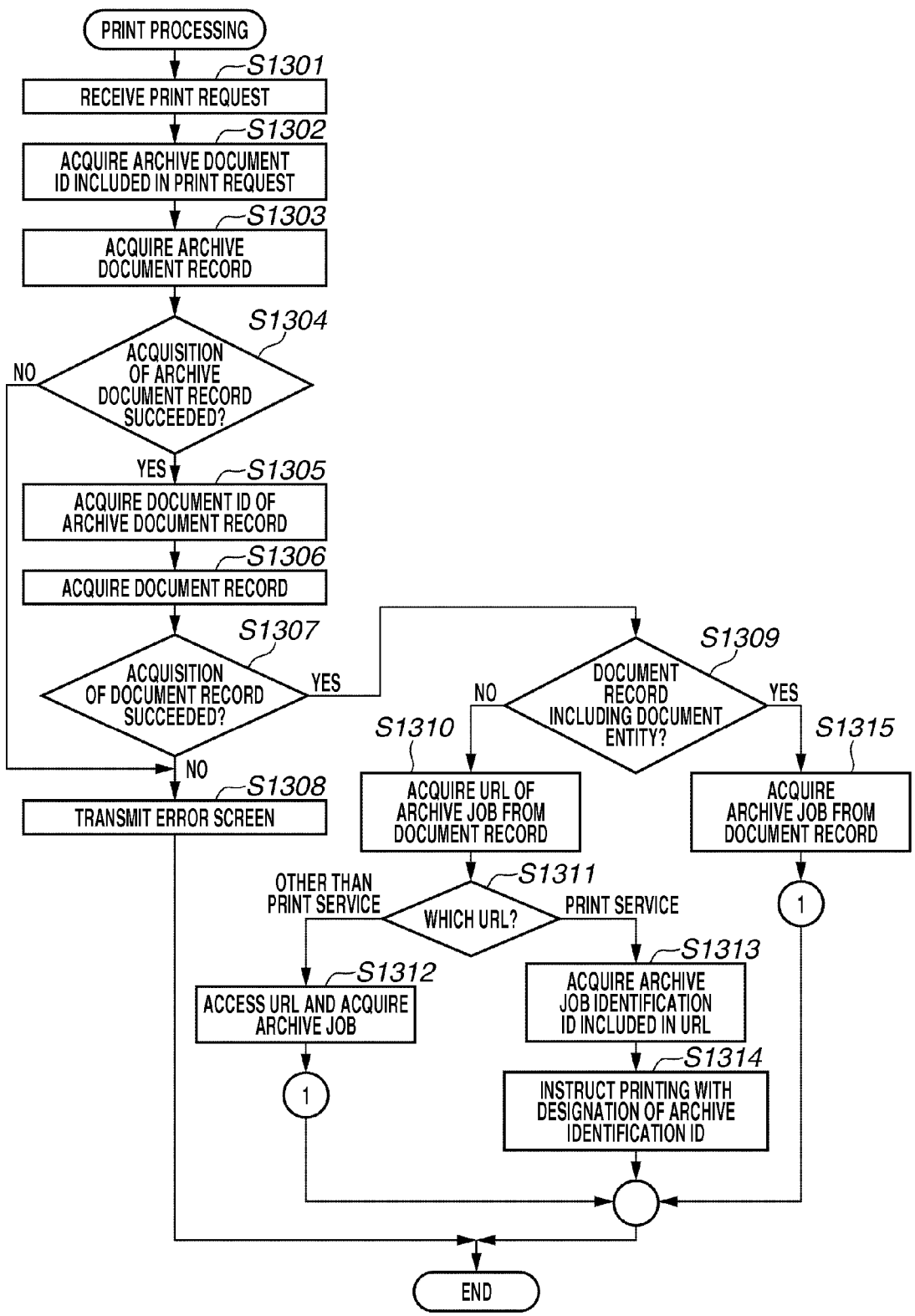
FIG. 13 is a flowchart illustrating print processing.
Figure 14:
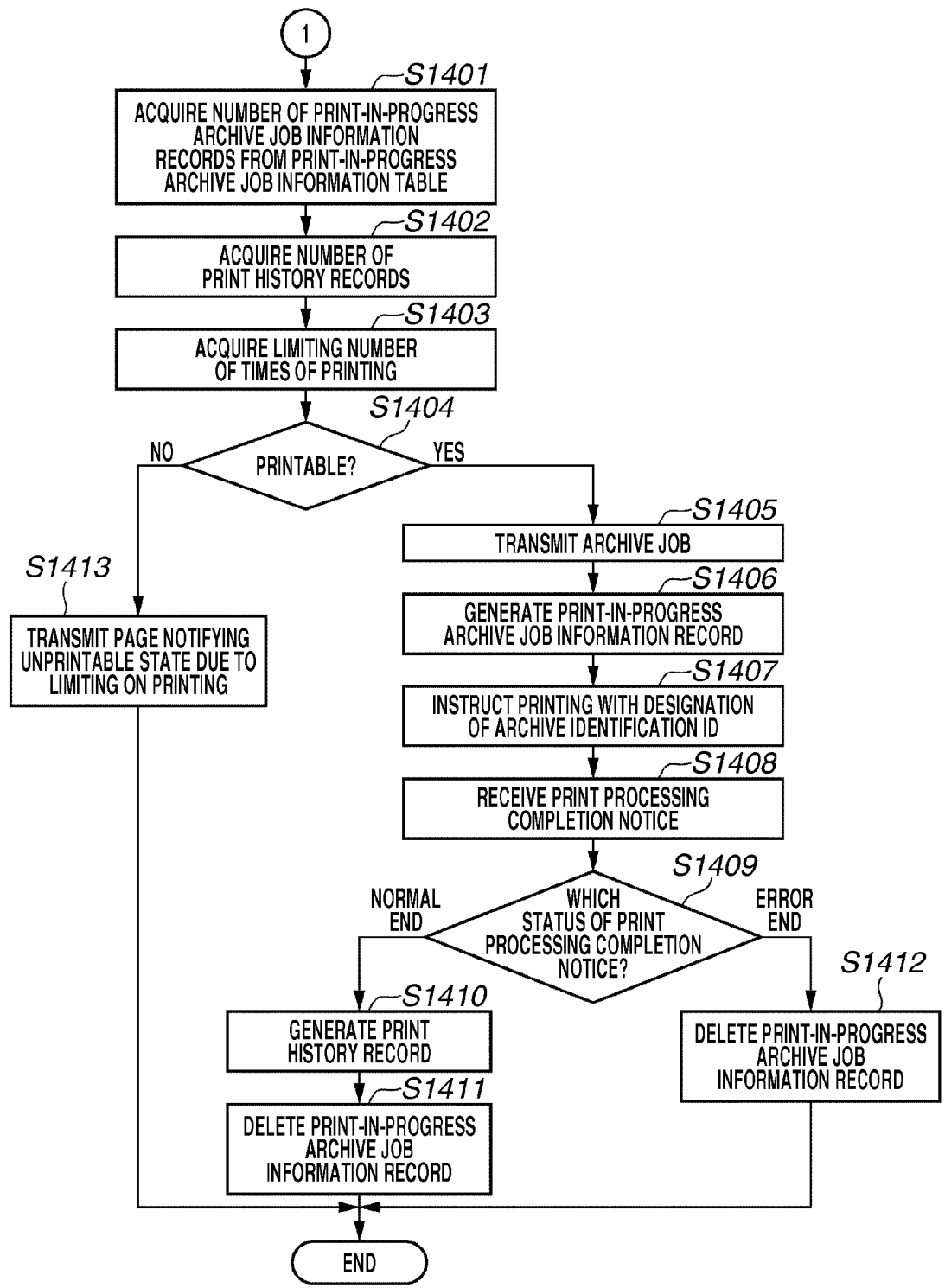
FIG. 14 is a flowchart that follows the flowchart illustrated in FIG. 13.

FIG. 13 and FIG. 14 are flowcharts illustrating an example of print processing that can be performed by the print server 105. The print processing described in the flowcharts illustrated in FIGS. 13 and 14 is started in response to a redirect to the print server 105 from the web browser 401, which results from the redirect URL generation processing illustrated in FIG. 12.

The control unit 802 includes the CPU 201, the RAM 203, the ROM 202, and the HDD 204. The processing procedure of the flowcharts is stored in any of storage units including the RAM 203, the ROM 202, and the HDD 204 of the control unit 1102 and executed by the CPU 201.

First, in step S1301, the transmission/reception unit 801 receives a print request from the web browser 401. Next, in step S1302, the control unit 802 acquires the archive document ID 612 included in the print request. Next, in step S1303, the data access unit 804 acquires a archive document record (i.e., a record in the archive document table 611) that corresponds to the archive document ID 612 acquired in step S1302 from the cloud platform service 102. In this case, the data access unit 804 sets a session ID included in the print request received in step S1301 as a request header for access to the cloud platform service 102.

Next, in step S1304, the control unit 802 determines whether the data access unit 804 has succeeded in acquisition of the archive document record. If the data access unit 804 has succeeded in the acquisition of the archive document record (YES in step S1305), the processing proceeds to step S1305.

In step S1305, the control unit 802 acquires the document ID 613 of the stored document record acquired in step S1303. Next, in step S1306, the data access unit 804 acquires the document record (i.e., the record in the document table 601) that corresponds to the document ID 613 acquired in step S1305 from the cloud platform service 102.

Next, in step S1307, the control unit 802 determines whether the data access unit 804 has succeeded in acquisition of the document record. If the data access unit 804 has succeeded in the acquisition of the document record (YES in step S1307), the processing proceeds to step S1309. The control unit 802 determines whether the document record acquired in step S1306 includes the document entity 604.

If the document record includes the document entity 604 (YES in step S1309), the processing proceeds to step S1315. The control unit 802 acquires a archive job from the document entity 604 of the document record.

Next, the processing proceeds to step S1401 illustrated in FIG. 14. The print-in-progress job information management unit 805 designates the ID 613 acquired in step S1304 and acquires the number of print-in-progress archive job information records whose document ID 904 coincides with the document ID 613 from a print-in-progress archive job information table 901.

Next, in step S1402, the data access unit 804 designates ID 612 acquired in step S1302 and acquires the number of print history records (i.e., the number of records in the print history table 621) that corresponds to the archive document ID 612 from the cloud platform service 102. In this case, the data access unit 804 sets a session ID included in the print request received in step S1301 as a request header for access to the cloud platform service 102. Alternatively, in step S1402, the data access unit 804 can acquire the record from the print history table 621 instead of acquiring the number of records in the print history table 621.

Next, in step S1403, the control unit 802 acquires the limiting number of times of printing 614 from the archive document record acquired in step S1303. Next, in step S1404, the control unit 802 determines whether the archive job acquired in step S1315 is printable.

The control unit 802 performs the above-described determination based on the number of print history records acquired in step S1402, the number of print-in-progress archive job information records acquired in step S1401, and the limiting number of times of printing acquired in step S1403.

To determine whether the archive job acquired in step S1315 is printable, the control unit 802 compares a sum of the number of print history records acquired in step S1402 and the number of print-in-progress archive job information records acquired in step S1401 with the limiting number of times of printing acquired in step S1402.

More specifically, if the sum of the number of print history records and the number of print-in-progress archive job information records is equal to or less (or less) than the limiting number of times of restrictive printing, the control unit 802 determines that the archive job acquired in step S1315 is printable.

If it is determined that the archive job is printable (YES in step S1404), the processing proceeds to step S1405. The archive job transmission unit 806 transmits the archive job to the archive job management service 403. Next, in step S1406, the print-in-progress job information management unit 805 generates a print-in-progress archive job information record (i.e., the record in the print-in-progress archive job information table 901).

The generation of the above-described print-in-progress archive job information record is performed by designating a archive job identification ID of the archive job information obtained as a return value resulting from the transmission of the archive job in step S1405 and the document ID 613 acquired in step S1305.

Next, in step S1407, the transmission/reception unit 801 transmits a print request that includes a designation of the archive job identification ID to the archive job management service 403. Print processing to be performed after the print request has been transmitted can be realized, for example, by performing the following processing.

First, the page generation unit 803 generates a page including an embedded URL required for redirection to the image forming apparatus 106 and a command that instructs the image forming apparatus 106 to perform a pull print operation while designating the archive job identification ID from the archive job management service 403. Then, the control unit 802 transmits the page generated by the page generation unit 803 to the web browser 401.

If the web browser 401 receives the page generated by the page generation unit 803, the web browser 401 redirects the received page to the pull print application 405 of the image forming apparatus 106. Then, the pull print application 405 interprets the command included in the page and acquires a archive job based on a designation of the archive job identification ID from the archive job management service 403. Further, the pull print application 405 performs pull print processing for the acquired archive job. An already-known technique is usable to realize the above-described print processing. Therefore, a detailed description is omitted in the present exemplary embodiment.

Next, in step S1408, the transmission/reception unit 801 receives a print processing completion notice together with the archive job identification ID. The print processing completion notice can be notified by the web browser 401 or can be notified by the control unit 812 of the archive job management service 403. Further, the print processing completion notice can be notified by any other device.

Next, in step S1409, the control unit 802 determines the status of the print processing completion notice notified in step S1408. If the status of the print processing completion notice is "normal end", the processing proceeds to step S1410. The control unit 802 generates a print history record.

In this case, the control unit 802 sets reception date and time of the print processing completion notice as the print date/time 623 of the print history record. Further, the control unit 802 sets the archive document ID 612 acquired in step S1302 as the archive document ID 624. Then, the transmission/reception unit 801 transmits the generated print history record to the cloud platform service 102.

Next, in step S1411, the print-in-progress job information management unit 805 designates the archive job identification ID notified from the archive job management service 403 in step S1406 and deletes the print-in-progress archive job information record. Then, the control unit 802 terminates the processing of the flowcharts illustrated in FIG. 13 and FIG. 14.

If the status of the print processing completion notice determined in step S1409 is "error end", the processing proceeds to step S1412. In S1412, the print-in-progress job information management unit 805 designates the archive job identification ID notified from the archive job management service 403 in step S1406 and deletes the print-in-progress archive job information record. Then, the control unit 802 terminates the processing of the flowcharts illustrated in FIG. 13 and FIG. 14.

If it is determined that the archive job is unprintable (NO in step S1404), the processing proceeds to step S1413. When the processing proceeds to step S1413, the page generation unit 803 generates a page notifying a state where the number of prints of the archive job has reached the limiting number of times of printing. The control unit 802 transmits the page generated by the page generation unit 803, as a response to the print request, to the web browser 401. Then, the control unit 802 terminates the processing of the flowcharts illustrated in FIG. 13 and FIG. 14.

Further, if it is determined that the document record does not include the document entity 604 (NO in step S1309), the processing proceeds to step S1310. In step S1310, the control unit 802 acquires URL information of the archive job from the document referential URL 605 of the document record. Next, in step S1311, the control unit 802 determines whether the URL acquired in step S1310 is the URL of the print server 105.

If it is determined that the URL acquired in step S1310 is not the URL of the print server 105, the processing proceeds to step S1312. The data access unit 804 accesses the URL acquired in step S1310 and acquires a archive job. The subsequent processing is similar to the above-described processing performed in step S1315 and step S1401 to S1403 and therefore detailed descriptions thereof are omitted.

On the other hand, if it is determined that the URL acquired in step S1310 is the URL of the print server 105, the processing proceeds to step S1313. The control unit 802 acquires the archive job identification ID included in the URL acquired in step S1310. Next, in step S1314, the control unit 802 transmits a print request including a designation of the archive job identification ID to the archive job management service 403. The subsequent print processing is an already-known technique and is similar to the processing performed in step S1407 and subsequent steps and therefore detailed descriptions thereof are omitted.

If the data access unit 804 has failed in the acquisition of the archive document record (NO in step S1304), or if the data access unit 804 has failed in the acquisition of the document record (NO in step S1307), the processing proceeds to step S1308. In step S1308, the control unit 802 generates an error screen and transmits the generated error screen, as a response to the print request, to the web browser 401. Then, the control unit 802 terminates the processing of the flowcharts illustrated in FIG. 13 and FIG. 14. Through the above-described processing, the print server 105 can complete the print processing.

As described above, in the present exemplary embodiment, the cloud platform service 102 stores the document entity 604 or the document referential URL 605 of the archive job, the limiting number of times of printing 614 for the archive job, and the print history of the archive job, while associating them with each other.

Further, the print server 105 generates and stores the print-in-progress archive job information (the print-in-progress archive job information table 901). Then, if the print server 105 receives a print request, the print server 105 acquires the limiting number of times of printing 614 for the archive job to be printed from the cloud platform service 102 and the archive job print history (the number of records in the print history table 621).

Then, if the sum of the number of records in the print history table 621 and the number of print-in-progress archive job information records is less than the limiting number of times of printing, the print server 105 determines that the archive job is printable. Accordingly, the print server 105 can limit, in an integrated manner, the number of times of printing with respect to each document stored in any service other than the print server 105 (such as the cloud platform service 102 or in the storage service 104).

In the present exemplary embodiment, each of the cloud platform service 102, the print server 105, and the archive job generation service 103 has been described as being constituted by a single machine. However, clustering at least one of the above-described services with a plurality of machines is useful to disperse the processing load.

Next, a second exemplary embodiment is described below. In the first exemplary embodiment, if the print button 704 is pressed on the archive document screen 701, the print request is constantly redirected to the print server 105. On the other hand, in the present exemplary embodiment, if the number of times of printing has already reached the number of times of restrictive printing in the printing of a archive job stored in the cloud platform service 102 or in the storage service 104, the print request is not redirected to the print server 105.

As described above, the present exemplary embodiment is different from the first exemplary embodiment in part of the redirect URL generation processing. Accordingly, in the following description of the present exemplary embodiment, components similar to those described in the first exemplary embodiment are denoted by the same reference numerals illustrated in FIG. 1 to FIG. 14 and detailed descriptions are omitted.

Figure 15:
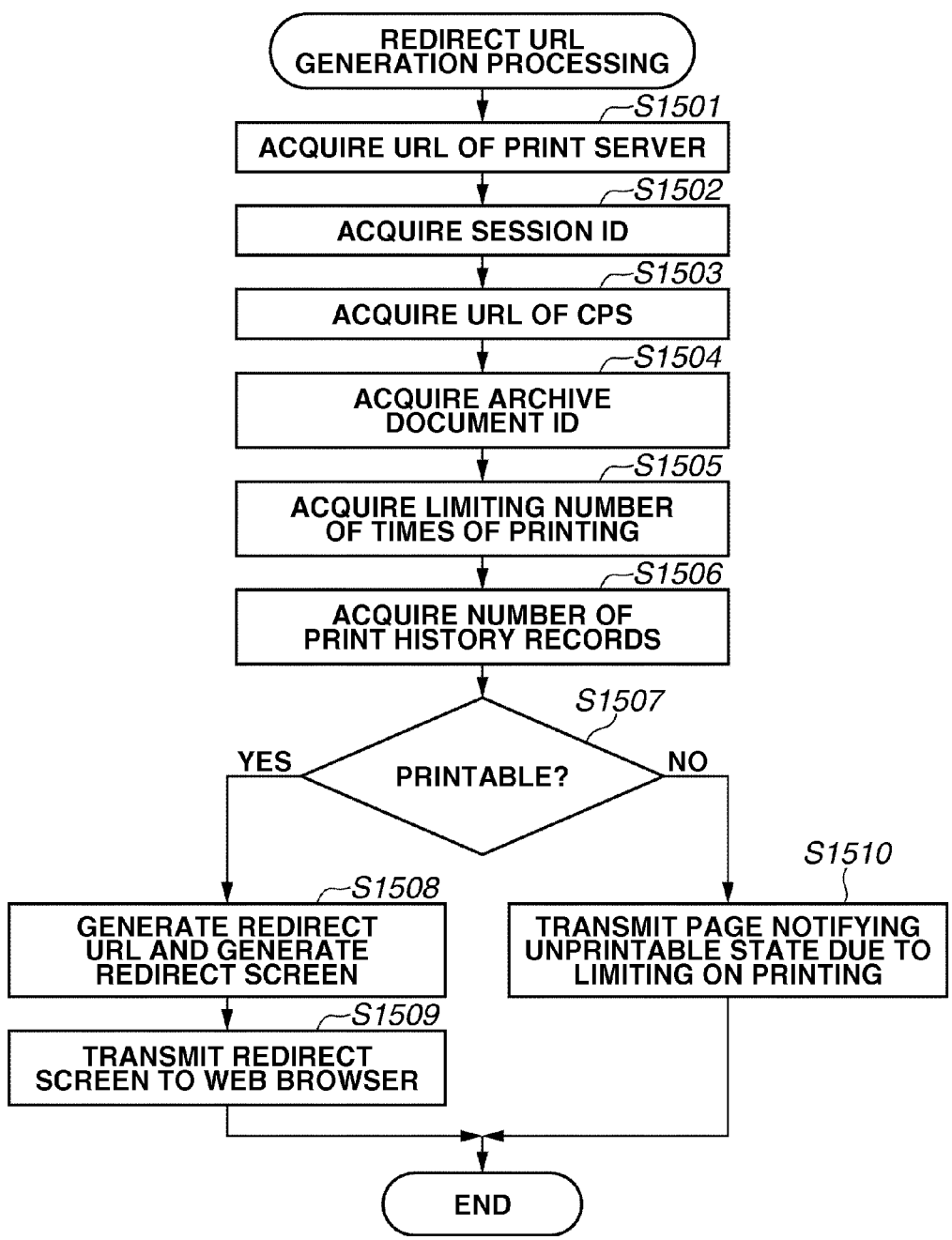
FIG. 15 is a flowchart illustrating second redirect URL generation processing.

FIG. 15 is a flowchart illustrating an example of the redirect URL generation processing that can be performed by the cloud platform service 102 according to the present exemplary embodiment. Processing to be performed in steps S1501 to S1504 in FIG. 15 is similar to the processing performed in steps S1201 to S1204 illustrated in FIG. 12 and therefore detailed descriptions thereof are omitted.

In step S1505, the control unit 502 acquires the limiting number of times of printing 614 from the archive document record displayed on the archive document screen 701. Next, in step S1506, the control unit 502 acquires the number of print history records corresponding to the designated archive document ID from the data management unit 506.

Next, in step S1507, the control unit 502 determines whether the archive document is printable based on the number of print history records acquired in step S1506 and the limiting number of times of printing acquired in step S1505. The determination whether the archive document is printable is performed based on a comparison between the number of print history records acquired in step S1506 and the limiting number of times of printing acquired in step S1505. More specifically, if the number of print history records is less than the limiting number of times of printing, the control unit 502 determines that the archive document is printable.

If it is determined that the archive document is printable (YES in step S1507), the control unit 502 performs processing in steps S1508 and S1509. Then, the control unit 502 terminates the processing of the flowchart illustrated in FIG. 15. Processing to be performed in steps S1508 and S1509 is similar to the processing performed in steps S1205 and S1206 illustrated in FIG. 12 and therefore detailed descriptions thereof are omitted.

On the other hand, if it is determined that the archive document is unprintable (NO in step S1507), the processing proceeds to step S1510. The page generation unit 803 generates a page notifying a state where the number of prints of the archive job has reached the number of times of restrictive printing. Then, the control unit 502 transmits the page generated by the page generation unit 803, as a response to the print request, to the web browser 401. Then, the control unit 502 terminates the processing of the flowchart illustrated in FIG. 15.

As described above, in the present exemplary embodiment, if the number of print history records is not less than the number of times of restrictive printing, no print request is redirected to the print server 105. Accordingly, compared to the first exemplary embodiment, the load placed on the print server 105 can be reduced.

As described in the first and second exemplary embodiments, using the number of records in the print-in-progress archive job information table 901 is desired because accurately determining whether a print requested archive job is printable is feasible considering the presence of the print-in-progress archive job.

However, it is not always necessary to include the number of print-in-progress archive jobs in determining whether the print requested archive job is printable. For example, it is useful to set the number of times of restrictive printing considering the presence of any print-in-progress archive job.

Further, it is desired to provide the archive job generation service 103 that can generate a archive job as described above in the first and second exemplary embodiments because information according to a storage destination (e.g., the cloud platform service 102, the storage service 104, or the print server 105) can be generated.

However, it is not always necessary to provide the archive job generation service 103 in the printing system. Further, it is desired to provide the storage service 104 because the management of archive jobs is easy. However, it is not always necessary to provide the storage service 104 in the printing system.

In the first and second exemplary embodiments, for example, an example of a archive job management apparatus can be realized by an example of the cloud platform service 102. Further, for example, an example of a print management apparatus can be realized by the print server 105. Further, for example, an example of a archive job generation apparatus can be realized by the archive job generation service 103.

Further, for example, the document entity 604 is an example of the entity of a archive job. The document referential URL 605 is an example of the archive job storage destination. Further, the number of records in the print history table 621 is an example of the print history. Further, for example, an example of an acquisition unit of the print management apparatus can be realized by executing the processing in steps S1303, S1402, and S1403. An example of a determination unit of the print management apparatus can be realized by executing the processing in step S1404.

Further, for example, the print-in-progress archive job information table 901 is an example of the print-in-progress archive job information. An example of a print-in-progress job information storage unit can be realized by executing the processing in step S1406. Further, for example, an example of a print-in-progress job information generation unit of the print management apparatus can be realized by executing the processing in step S1406.

An example of a print-in-progress job information deletion unit of the print management apparatus can be realized by executing the processing in steps S1411 and S1412. Further, for example, an example of a print history generation unit and an example of a transmission unit of the print management apparatus can be realized by executing the processing in step S1410.

Further, for example, an example of a redirect information generation unit of the archive job management apparatus can be realized by executing the processing in steps S1205 and S1508. Further, for example, an example of a redirect information transmission unit of the archive job management apparatus can be realized by executing the processing in steps S1206 and S1509. Further, for example, a response screen including a redirect URL is an example of redirect information. Further, for example, an example of the archive job management apparatus can be realized by executing the processing in step S1507.

Further, for example, an example of a reception unit of the archive job generation apparatus can be realized by executing the processing in step S1001. An example of a determination unit of the archive job generation apparatus can be realized by executing the processing in step S1005. Further, for example, an example of a first storing control unit and an example of a second storing control unit of the archive job generation apparatus can be realized by executing the processing in steps S1006 and S1007 and in steps S1012 and S1013, respectively.

Further, for example, an example of a transmission unit of the archive job generation apparatus can be realized by executing the processing in step S1011. Further, for example, information relating to a document is an example of document information. The archive document record is an example of archive document information.

Each of the above-described exemplary embodiments is a mere example that can employ the present invention and cannot be used to narrowly interpret the technical scope of the present invention. More specifically, the present invention can be modified in various ways without departing from the technical scope or its principal features.

Other Embodiments

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium). In such a case, the system or apparatus, and the recording medium where the program is stored, are included as being within the scope of the present invention. In an example, a computer-readable medium may store a program that causes a printing system or apparatus or unit therein to perform a method described herein. In another example, a central processing unit (CPU) may be configured to control at least one unit utilized in a method or apparatus described herein.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-144108 filed Jun. 24, 2010, which is hereby incorporated by reference herein in its entirety.

What is claimed is:

1. A printing system comprising:

an archive job management apparatus including a job information management unit configured to store job information relating to an entity or a storage destination of an archive job, which is a print job stored in a storage medium, limiting number of times of printing for the archive job, and print history of the archive job, while associating each stored information with other stored information, in the storage medium, and configured to manage the stored job information; and a print management apparatus configured to instruct an image forming apparatus to perform printing of an archive job according to a print request from a client apparatus, wherein the print management apparatus includes:

an acquisition unit configured to acquire a limiting number of times of printing and the print history as information about the archive job according to the print request, and a determination unit configured to determine that the archive job is printable if a number of times the archive job has been actually printed is equal to or less than the limiting number of times of printing based on a number of times of restrictive printing and the print history of the print requested archive job; and wherein the archive job management apparatus further includes:

a redirect information generation unit configured to generate redirect information, which includes information that can identify the print requested archive job, and information that can specify the archive job management apparatus, wherein the redirect information is required when the client apparatus redirects a response to the print request, if returned from the archive job management apparatus, to the print management apparatus, and a redirect information transmission unit configured to transmit the redirect information, as a response to the print request, to the client apparatus.

2. The printing system according to claim 1, wherein the print management apparatus further includes:

a print-in-progress job information storage unit configured to store print-in-progress job information, which is information relating to an archive job whose processing is currently executed to perform printing in the image forming apparatus, in the storage medium, wherein the determination unit of the print management apparatus determines that the archive job is printable if the number of times the archive job has been actually printed is equal to or less than the limiting number of times of printing, based on the limiting number of times of printing and the print history of the print requested archive job as well as based on the print-in-progress job information.

3. The printing system according to claim 2, wherein the print management apparatus further includes:

a print-in-progress job information generation unit configured to generate print-in-progress job information relating to the archive job before the printing of the archive job is terminated if the determination unit of the print management apparatus determines that the print requested archive job is printable, and a print-in-progress job information deletion unit configured to delete the print-in-progress job information relating to the archive job when the printing of the print requested archive job is terminated, wherein the print-in-progress job information storage unit is configured to store the print-in-progress job information generated by the print-in-progress job information generation unit in the storage medium.

4. The printing system according to claim 1, wherein the acquisition unit of the print management apparatus acquires the entity or the storage destination of the print requested archive job, the limiting number of times of printing for the archive job, and the print history of the archive job, from the archive job management apparatus, and the determination unit of the print management apparatus determines whether the archive job is printable based on the limiting number of times of printing and the print history of the print requested archive job when the entity of the print requested archive job is acquired and when the storage destination of the print requested archive job is other than the print management apparatus.

5. The printing system according to claim 1, wherein the print management apparatus further includes:
   a print history generation unit configured to generate a print history of the archive job when the printing of the print requested archive job is normally terminated, and
   a transmission unit configured to transmit the print history to the archive job management apparatus, wherein the job information management unit of the archive job management apparatus generates or updates the print history of the archive job stored in the storage medium based on the print history transmitted by the transmission unit.

6. The printing system according to claim 1, wherein the archive job management apparatus further includes:
   a determination unit configured to determines whether the print requested archive job is printable based on the limiting number of times of printing and the print history of the print requested archive job, wherein the redirect information transmission unit is configured to transmit the redirect information, as a response to the print request, to the client apparatus only when the determination unit of the archive job management apparatus determines that the print requested archive job is printable.

7. The printing system according to claim 1, further comprising:
   an archive job generation apparatus that generates an archive job, wherein the archive job generation apparatus includes:
   a reception unit configured to receive a generation request of the archive job from an external device,
   a generation unit configured to generate an archive job according to the request received by the reception unit of the archive job generation apparatus,
   a determination unit configured to determine a storage destination of the generation requested archive job based on storage destination information included in the request received by the reception unit of the archive job generation apparatus,
   a first storing control unit configured to generate document information including the entity of the archive job if the storage destination of the generation requested archive job is the archive job management apparatus, and further configured to generate archive document information including the limiting number of times of printing included in the request as the limiting number of times of printing for the archive job, and transmit the generated information to the archive job management apparatus,
   a second storing control unit configured to generate document information including the archive job storage destination if the storage destination of the generation requested archive job is the print management apparatus, and further configured to generate archive document information including the limiting number of times of printing included in the request as the limiting number of times of printing for the archive job, and transmit the generated information to the archive job management apparatus, and
   a transmission unit configured to transmit the entity of the archive job to the print management apparatus when the storage destination of the generation requested archive job is the print management apparatus.

8. A print control method for a printing system having an archive job management apparatus that includes a job information management unit, a redirect information generation unit, and a redirect information transmission unit, and having a print management apparatus that includes an acquisition unit and a determination unit, wherein the print management apparatus is configured to instruct an image forming apparatus to perform printing of an archive job according to a print request from a client apparatus, the print control method comprising:
   storing, via the job information management unit, job information relating to an entity or a storage destination of an archive job, which is a print job stored in a storage medium, limiting number of times of printing for the archive job, and print history of the archive job, while associating each stored information with other stored information, in the storage medium;
   managing, via the job information management unit, the stored job information;
   generating, via the redirect information generation unit, redirect information, which includes information that can identify the print requested archive job, and information that can specify the archive job management apparatus, wherein the redirect information is required when the client apparatus redirects a response to the print request, if returned from the archive job management apparatus, to the print management apparatus;
   transmitting, via the redirect information transmission unit, the redirect information, as a response to the print request, to the client apparatus;
   acquiring, via the acquisition unit, a limiting number of times of printing and the print history as information about the archive job according to the print request; and
   determining, via the determination unit, that the archive job is printable if a number of times the archive job has been actually printed is equal to or less than the limiting number of times of printing based on a number of times of restrictive printing and the print history of the print requested archive job.

9. The print control method according to claim 8, wherein the print management apparatus further includes a print-in-progress job information storage unit, the print control method further comprising:
   storing, via the print in progress job information storage unit, print-in-progress job information, which is information relating to an archive job whose processing is currently executed to perform printing in the image forming apparatus, in the storage medium, wherein determining via the determination unit of the print management apparatus includes determining that the archive job is printable if the number of times the archive job has been actually printed is equal to or less than the limiting number of times of printing, based on the limiting number of times of printing and the print history of the print requested archive job as well as based on the print-in-progress job information.

10. The print control method according to claim 9 wherein the print management apparatus further includes a print-in-progress job information generation unit and a print-in-progress job information deletion unit, the print control method further comprising:
- generating, via the print in progress job information generation unit, print-in-progress job information relating to the archive job before the printing of the archive job is terminated if the determination unit of the print management apparatus determines that the print requested archive job is printable; and
- deleting, via the print in progress job information deletion unit, the print-in-progress job information relating to the archive job when the printing of the print requested archive job is terminated, wherein the print in progress job information storage unit stores the print-in-progress job information generated by the print-in-progress job information generation unit in the storage medium.

11. The print control method according to claim 8,
- wherein acquiring via the acquisition unit of the print management apparatus includes acquiring the entity or the storage destination of the print requested archive job, the limiting number of times of printing for the archive job, and the print history of the archive job, from the archive job management apparatus, and
- wherein determining via the determination unit of the print management apparatus includes determining whether the archive job is printable based on the limiting number of times of printing and the print history of the print requested archive job when the entity of the print requested archive job is acquired and when the storage destination of the print requested archive job is other than the print management apparatus.

12. The print control method according to claim 8, further comprising:
- generating, via a print history generation unit, a print history of the archive job when the printing of the print requested archive job is normally terminated;
- transmitting, via a transmission unit, the print history to the archive job management apparatus, wherein storing via the job information management unit of the archive job management apparatus includes generating or updating the print history of the archive job stored in the storage medium based on the print history transmitted by the transmission unit.

13. The print control method according to claim 8, wherein the archive job management apparatus further includes a determination unit, the print control method further comprising:
- determining, via the determination unit of the archive job management apparatus, whether the print requested archive job is printable based on the limiting number of times of printing and the print history of the print requested archive job, wherein transmitting via the redirect information transmission unit includes transmitting the redirect information, as a response to the print request, to the client apparatus only when the determination unit of the archive job management apparatus determines that the print requested archive job is printable.

14. The print control method according to claim 8, wherein the printing system further includes an archive job generation apparatus that generates an archive job and includes: a reception unit, a generation unit, a determination unit, a first storing control unit, a second storing control unit, and a transmission unit, the print control method further comprising:
- receiving, via the reception unit of the archive job generation apparatus, a generation request of the archive job from an external device;
- generating, via the generation unit of the archive job generation apparatus, an archive job according to the request received by the reception unit of the archive job generation apparatus;
- determining, via the determination unit of the archive job generation apparatus, a storage destination of the generation requested archive job based on storage destination information included in the request received by the reception unit of the archive job generation apparatus;
- generating, via the first storing control unit of the archive job generation apparatus, document information including the entity of the archive job if the storage destination of the generation requested archive job is the archive job management apparatus, and generating, via the first storing control unit of the archive job generation apparatus, archive document information including the limiting number of times of printing included in the request as the limiting number of times of printing for the archive job, and transmitting, via the first storing control unit of the archive job generation apparatus, the generated information to the archive job management apparatus;
- generating, via the second storing control unit of the archive job generation apparatus, document information including the archive job storage destination if the storage destination of the generation requested archive job is the print management apparatus, and generating, via the second storing control unit of the archive job generation apparatus, archive document information including the limiting number of times of printing included in the request as the limiting number of times of printing for the archive job, and transmitting, via the second storing control unit of the archive job generation apparatus, the generated information to the archive job management apparatus; and
- transmitting, via transmission unit of the archive job generation apparatus, the entity of the archive job to the print management apparatus when the storage destination of the generation requested archive job is the print management apparatus.

15. A non-transitory computer readable medium storing a program to cause a computer to perform the print control method according to claim 8.

* * * * *